United States Patent
Chiu et al.

(10) Patent No.: US 6,383,426 B1
(45) Date of Patent: May 7, 2002

(54) FOAMING AND FORMING METHOD FOR SOFT AND HARD TYPE POLY PRODUCTS

(76) Inventors: Kun-Hsiung Chiu, No. 37, Yu Tsu Chuang, Yu-Tung Tsun Hsi-Kuo Hsiang, Chia-I Hsien (TW); Hua-Mu Liu, 2F-1, No. 6, Alley 6, Lane 507, Chung-Ho St., Taipei (TW)

( * ) Notice: Subject to any disclaimer, the term of this patent is extended or adjusted under 35 U.S.C. 154(b) by 0 days.

(21) Appl. No.: 09/842,719

(22) Filed: Apr. 27, 2001

(51) Int. Cl.[7] .............................................. B29C 44/02
(52) U.S. Cl. ............................ 264/51; 264/53; 264/54; 264/129
(58) Field of Search ............................ 264/51, 53, 54, 264/129

(56) References Cited

U.S. PATENT DOCUMENTS

| | | | | |
|---|---|---|---|---|
| 4,001,361 A | * | 1/1977 | Unruh ........................ | 264/129 |
| 4,071,592 A | * | 1/1978 | Frisch ........................ | 264/54 |
| 4,119,583 A | * | 10/1978 | Filip et al. .................... | 264/54 |
| 4,381,962 A | * | 5/1983 | Sato et al. .................... | 264/54 |
| 4,666,763 A | * | 5/1987 | King et al. ................... | 264/53 |
| 5,391,335 A | * | 2/1995 | Sakamoto et al. ............ | 264/53 |

* cited by examiner

Primary Examiner—Allan R. Kuhns
(74) Attorney, Agent, or Firm—Bacon & Thomas

(57) ABSTRACT

A foaming and forming method for soft and hard types poly products that includes blending soft or hard type poly material (expanding resin) with selected proportion of additives of carbonic calcium powder, 2-heptanone, soda powder, water, starch power and phosphoric acid-3 to form an evenly blended product solution, injecting the blended product solution into a silicon or steel mold for rapidly generating required air bubbles (beehive shapes) to expand the product solution a number of times, hardening the product solution to form a semi-finished product to be released from the mold immediately, and performing colored painting and embellishment for the semi-finished product to form a light weight and easy to transport poly product.

10 Claims, 4 Drawing Sheets

FOAMING AND FORMING METHOD FOR SOFT AND HARD TYPE POLY PRODUCTS

BACKGROUND OF THE INVENTION

This invention relates to a foaming and forming method for soft and hard types poly products that includes changing and adding selected additives in poly products for rapidly generating air bubbles (beehive shapes) in a silicon or steel mold to enable the product solution expanding rapidly for a number of times and is released from the mold immediately when hardened then to perform colored painting and embellishment for the semi-finished product thereby to result in a light weight and easy to transport poly product.

The contemporary poly products mainly are made from unsaturated resins. The unsaturated resins will shrink during the forming process, but not expansion. Even after adding other additives, the formed volume and the volume of the product solution is about at the ratio of 1:1. Hence the resulting weight increases along with the increased volume. Furthermore, the time for forming is relatively long, at least thirty minutes (depends on the size of the product, could be more for larger size products). The weight could exceed the capacity limit of containing boxes and transportation. The large size poly products are difficult to release from the molds. Moreover, the poly products mostly have solid structure and make releasing from the molds even more difficult.

In order to remedy the problems set forth above, there are hollow producing methods being developed. Nevertheless, they still have drawbacks. For instance, the design of the molds requires a high degree of precision and delicacy to avoid the uneven thickness, fracture or crack resulting from temperature difference effect.

Furthermore, conventional poly products need a relative long forming time and also need higher costs in materials and production facilities. They have low economic effectiveness and low competitiveness.

SUMMARY OF THE INVENTION

It is therefore a primary object of this invention to provide a simpler foaming method for forming soft and hard types poly (expanding resin) thereby to produce products that are not possible for mass production by conventional ceramics and complicated wood carving.

Another object of this invention is to reduce the costs of manpower, materials, and production time and facilities.

A further object of this invention is to employ the foaming characteristics of soft and hard types poly (expanding resin) to expand application scope and enhance poly product quality.

Yet another object of this invention is to employ the foaming characteristics of soft and hard types poly (expanding resin) to equip the poly products with fireproof, drop-durable, deformation-resistant, anti-self-cracking and high toughness characteristics.

This invention mainly uses expanding resin and changes poly product additives, and injects the material into a silicon or steel mold to generate required aid bubbles (beehive shapes) rapidly for expanding the product solution a number of times. When the material is hardened, it is released from mold immediately, then proceed with colored painting and embellishment for the semi-finished product to result in a light weight and easy to transport poly product.

BRIEF DESCRIPTION OF THE DRAWINGS

The invention, as well as its many advantages, may be further understood by the following detailed description and drawings, in which.

DETAILED DESCRIPTION OF THE PREFERRED EMBODIMENT

Figure 1:
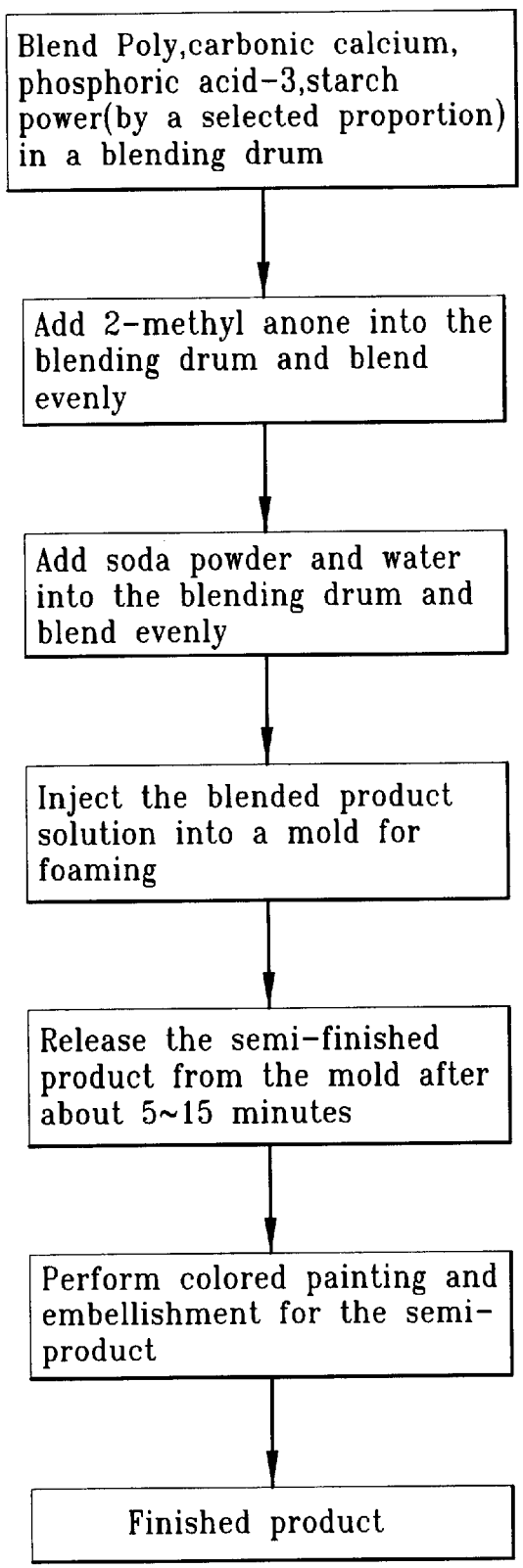
FIG. 1 is a process flow of this invention.
Figure 2A:
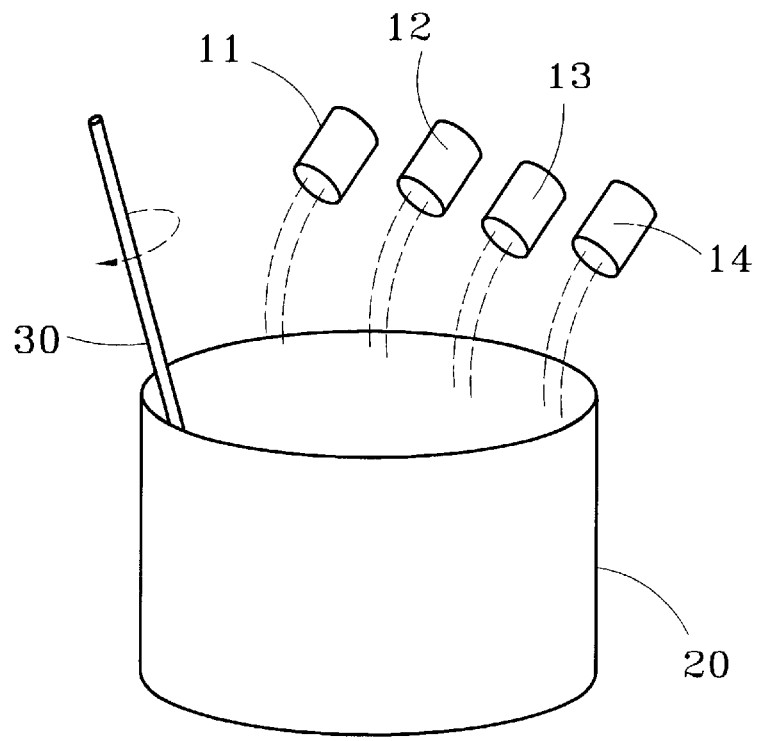
FIG. 2A is a schematic view of process step one of this invention.
Figure 2B:
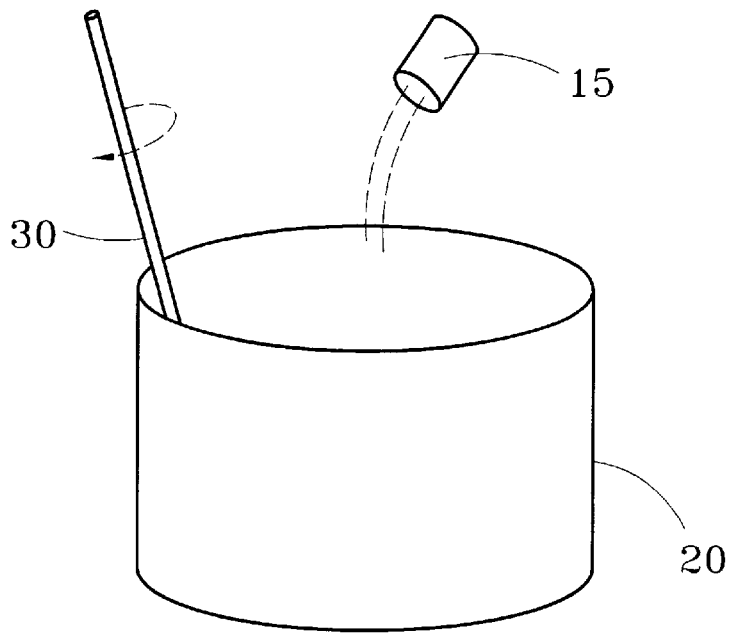
FIG. 2B is a schematic view of process step two of this invention.
Figure 2C:
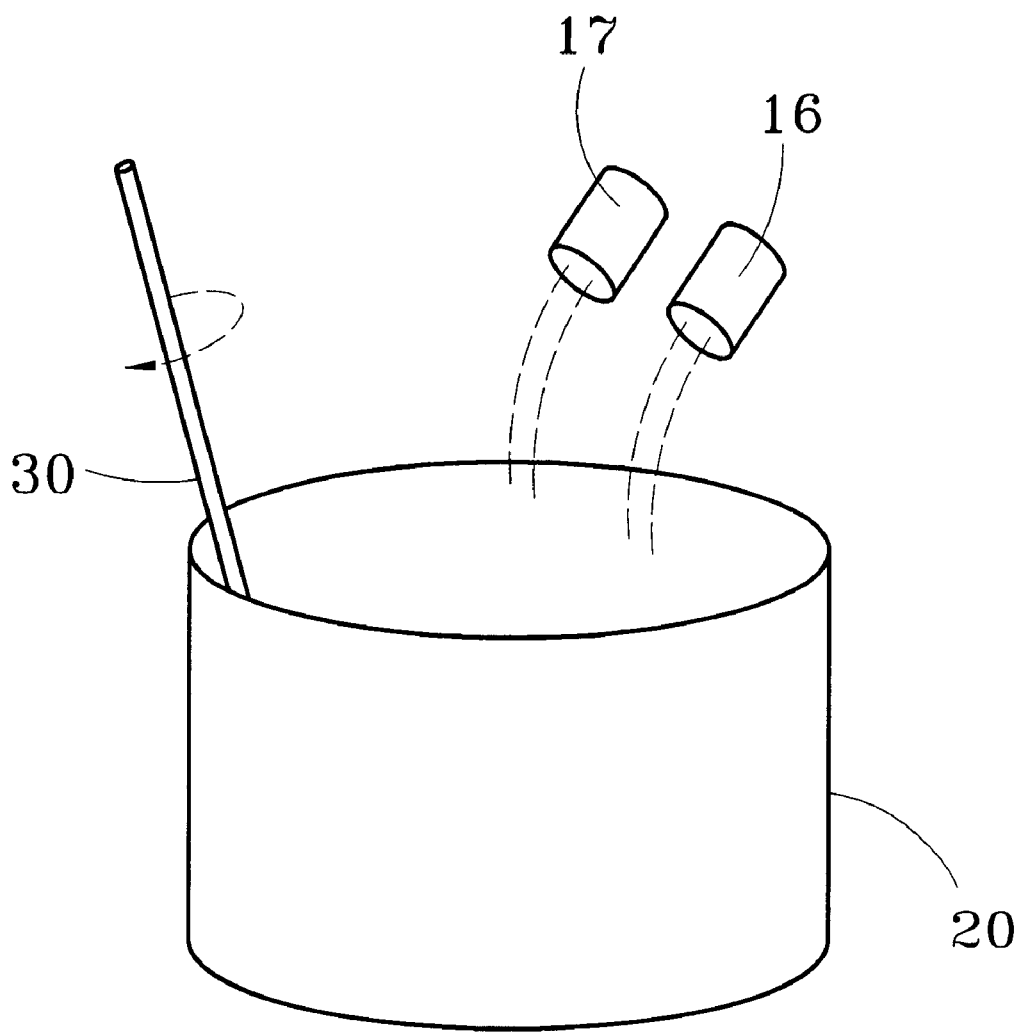
FIG. 2C is a schematic view of process step three of this invention.
Figure 2D:
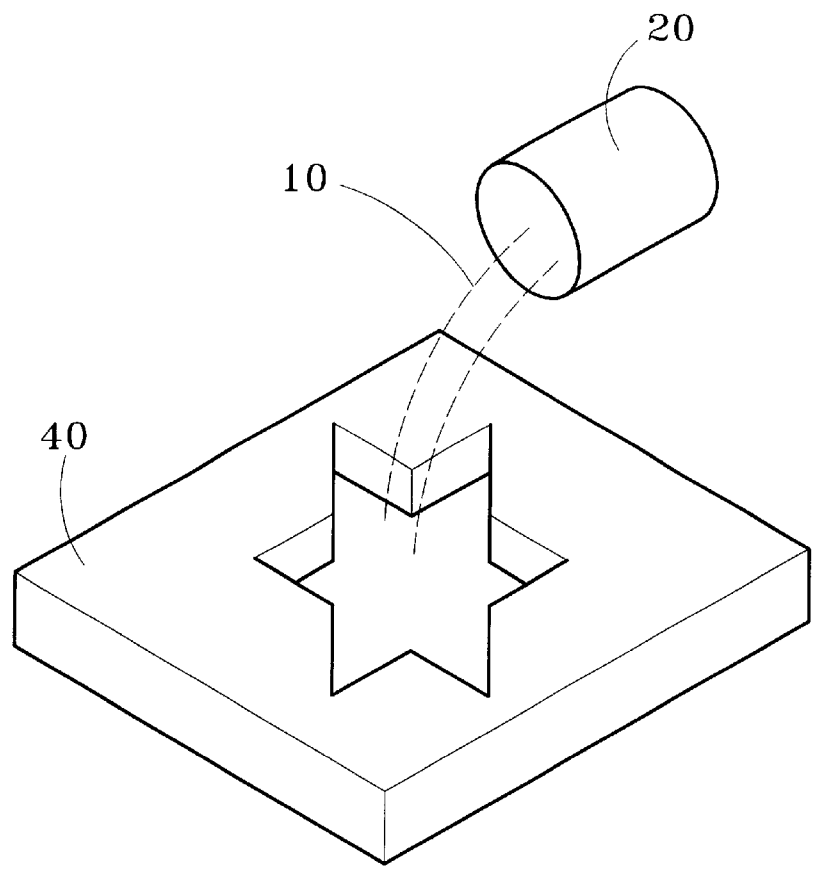
FIG. 2D is a schematic view of process step four of this invention.
Figure 2E:
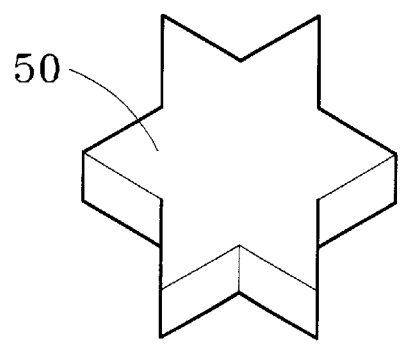
FIG. 2E is a schematic view of process step five of this invention.

Referring to FIG. 1, the process according to this invention includes the following steps:

pour 30% of hard or soft type poly material 11 (expanding resin), and 39% of carbonic calcium powder 12, 6% of phosphoric acid-3 13 (flame retardant fireproof agent), and 9% of starch powder 14 into a blending drum 20 for blending by a blending bar 30 (also shown in FIG. 2A); pour 0.5% of 2-heptanone 15 into the blending drum 20 and blending by the blending bar 30 (shown in FIG. 2B); pour 3% of soda powder 16 and 12% of water 17 into the blending drum 20 and blending continuously by the blending bar 30 (shown in FIG. 2C); inject the material which has been evenly blended in the blending drum 20 into a mold 40 which is formed in a desired shape (may be a silicon or steel mold) to proceed foaming process, and waiting about 5–15 minutes for forming to complete (shown in FIG. 2D); finally release and remove a semi-finished product 50 from the mold 40, and perform colored painting and embellishment for the semi-finished product 50 to produce the poly product (shown in FIG. 2E).

As this invention includes the phosphoric acid-3 (flame retardant fireproof agent), the resulting poly product has fireproof effect. Moreover, because of the foaming nature of this invention, the resulting products may be used in a wide variety of building materials, electronic insulation components, furniture, toys, complementary material for household appliances and various handicraft products.

Furthermore, this invention uses the expanding resin as main material and has changed the poly product additives, after evenly blending and forming product solution, it will rapidly generate air bubbles (beehive shapes) required when it is injected into the silicon or steel mold to expand the product solution a number of times. When the product is hardened and released from the mold immediately, the semi-finished product may be painted with color and embellished to result in a light weight and easy to transport poly product.

This invention may be adapted for mass production to reduce manpower and materials. Production time is only $\frac{1}{3}$ of the conventional production process. Materials cost is $\frac{1}{3}$ of conventional product. And the resulting poly product has fireproof, drop-durable, deformation-resistant, anti-self-cracking and high toughness characteristics.

While the preferred embodiment of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A foaming and forming method for soft and hard types of poly products, comprising the steps of:
   pouring 30% of poly, 39% of carbonic calcium powder, 6% of phosphoric acid-3, and 9% of starch powder into a blending drum for blending;
   pouring 0.5% of 2-heptanone into the blending drum for blending;
   pouring 3% of soda powder and 12% of water into the blending drum for blending evenly;
   injecting the materials which are evenly blended in the blending drum into a mold formed in a desired shape for proceeding to a foaming process, and waiting about 5–15 minutes for forming to be complete; and
   releasing a semi-finished product from the mold and performing colored painting and embellishment on the semi-finished product to form a poly product.

2. The method of claim 1, wherein the poly is a hard type or soft type material.

3. The method of claim 1, wherein the poly is an expanding resin.

4. The method of claim 1, wherein the mold is made of silicon or steel.

5. The method of claim 1, wherein the poly product is various building material formed by the mold.

6. The method of claim 1, wherein the poly product is an electronic insulation component formed by the mold.

7. The method of claim 1, wherein the poly product is furniture formed by the mold.

8. The method of claim 1, wherein the poly product is a toy formed by the mold.

9. The method of claim 1, wherein the poly product is a complementary material for household appliances formed by the mold.

10. The method of claim 1, wherein the poly product is a handicraft product formed by the mold.

* * * * *